United States Patent
Yamada

(10) Patent No.: US 10,567,619 B2
(45) Date of Patent: Feb. 18, 2020

(54) IMAGE FORMING APPARATUS, METHOD OF GENERATING IMAGE DATA THEREFOR AND STORAGE MEDIUM

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/400,590

(22) Filed: May 1, 2019

(65) Prior Publication Data

US 2019/0356818 A1    Nov. 21, 2019

(30) Foreign Application Priority Data

May 18, 2018    (JP) .................................. 2018-095865

(51) Int. Cl.
| | |
|---|---|
| H04N 1/60 | (2006.01) |
| G06K 15/14 | (2006.01) |
| G06K 15/02 | (2006.01) |
| G03G 15/08 | (2006.01) |
| H04N 1/405 | (2006.01) |

(52) U.S. Cl.
CPC ........... H04N 1/60 (2013.01); G03G 15/0856 (2013.01); G06K 15/14 (2013.01); G06K 15/1881 (2013.01); H04N 1/405 (2013.01); G03G 2215/0164 (2013.01); H04N 2201/0094 (2013.01)

(58) Field of Classification Search
CPC .. H04N 1/60; H04N 1/405; H04N 2201/0094; G03G 15/0856; G03G 2215/0164; G06K 15/14; G06K 15/1881
See application file for complete search history.

(56) References Cited

U.S. PATENT DOCUMENTS

| 2007/0041065 A1* | 2/2007 | Kubo | .................. H04N 1/4015 |
| | | | 358/521 |
| 2010/0103442 A1* | 4/2010 | Saiki | .................. G06K 15/129 |
| | | | 358/1.9 |

FOREIGN PATENT DOCUMENTS

JP    2006143140 A    6/2006

* cited by examiner

*Primary Examiner* — Quang N Vo
(74) *Attorney, Agent, or Firm* — Carter, DeLuca & Farrell LLP

(57) ABSTRACT

In a case where image correction is performed to deal with a registration shift and a color shift in an electrophotographic image forming apparatus, it is made possible to obtain a sufficient correction effect even in a high-quality mode. The image forming apparatus having a first printing mode and a second printing mode includes: at least one controller, having at least one processor which executes instructions stored in at least one memory, at least one circuitry or a combination of the at least one processor and the at least one circuitries, being configured to: perform scan line changing processing to shift an image in units of pixels in a sub scanning direction at a predetermined scan line changing point in a main scanning direction in accordance with characteristics of a laser scan line; and correct a tone level value of a pixel of interest in an image after the scan line changing processing by referring to a tone level value of a pixel adjacent to the pixel of interest in a sub scanning direction.

12 Claims, 15 Drawing Sheets

| x  | 1  | 2  | 3  | 4  | 5 | 6 | 7 | 8 | 9 | 10 | 11 | 12 | 13 | 14 | 15 | 16 |
|----|----|----|----|----|---|---|---|---|---|----|----|----|----|----|----|----|
| K0 | 15 | 14 | 12 | 10 | 9 | 8 | 7 | 7 | 6 | 5  | 5  | 5  | 4  | 4  | 3  | 2  |
| K1 | 0  | 2  | 3  | 4  | 4 | 5 | 5 | 5 | 6 | 7  | 7  | 8  | 9  | 10 | 12 | 14 |

FIG.6A

| x  | 1  | 2  | 3  | 4 | 5 | 6 | 7 | 8 | 9 | 10 | 11 | 12 | 13 | 14 | 15 | 16 |
|----|----|----|----|---|---|---|---|---|---|----|----|----|----|----|----|----|
| K0 | 15 | 13 | 11 | 9 | 8 | 7 | 6 | 5 | 5 | 5  | 4  | 3  | 2  | 2  | 2  | 2  |
| K1 | 0  | 2  | 2  | 2 | 2 | 3 | 4 | 5 | 5 | 5  | 6  | 7  | 8  | 9  | 11 | 13 |

FIG.6B

FIG.7A FIG.7B
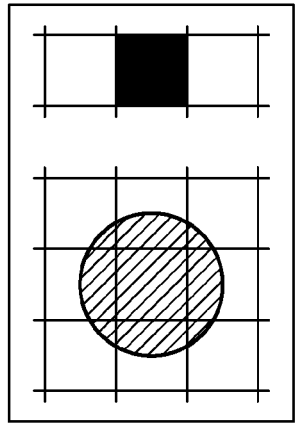 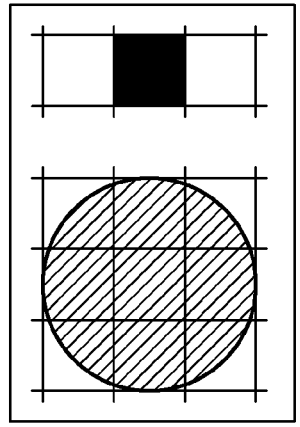
FIG.7C FIG.7D
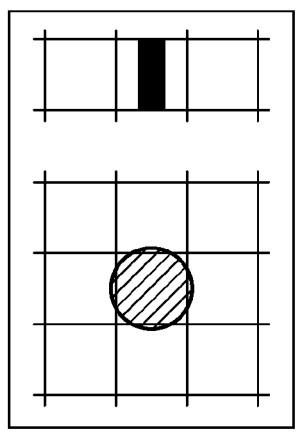 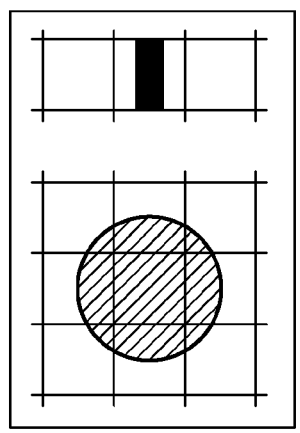
FIG.7E FIG.7F
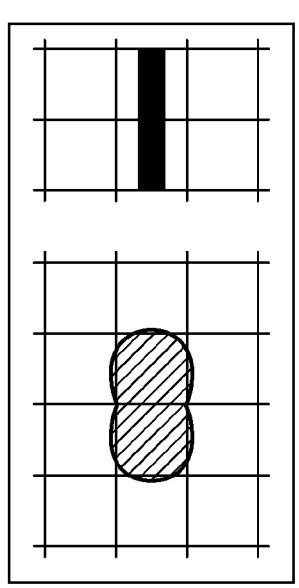 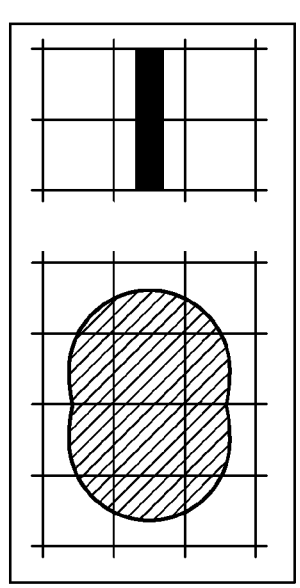

| INPUT | OUTPUT |
|---|---|
| 0 | 0x0000 |
| 1 | 0x0180 |
| 2 | 0x0380 |
| 3 | 0x03C0 |
| 4 | 0x07C0 |
| 5 | 0x07E0 |
| 6 | 0x0FE0 |
| 7 | 0x0FF0 |
| 8 | 0x1FF0 |
| 9 | 0x1FF8 |
| 10 | 0x3FF8 |
| 11 | 0x3FFC |
| 12 | 0x7FFC |
| 13 | 0x7FFE |
| 14 | 0xFFFE |
| 15 | 0xFFFF |

FIG.9

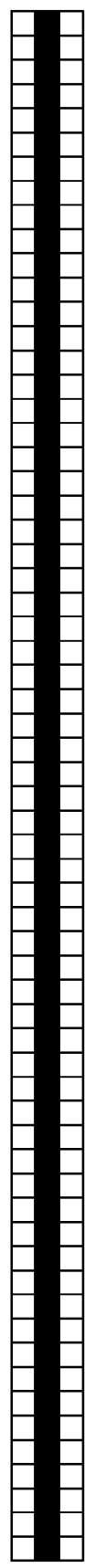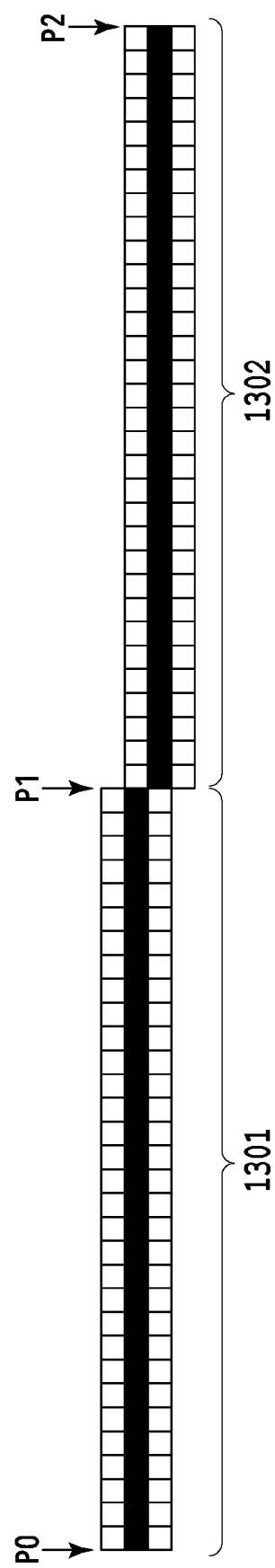

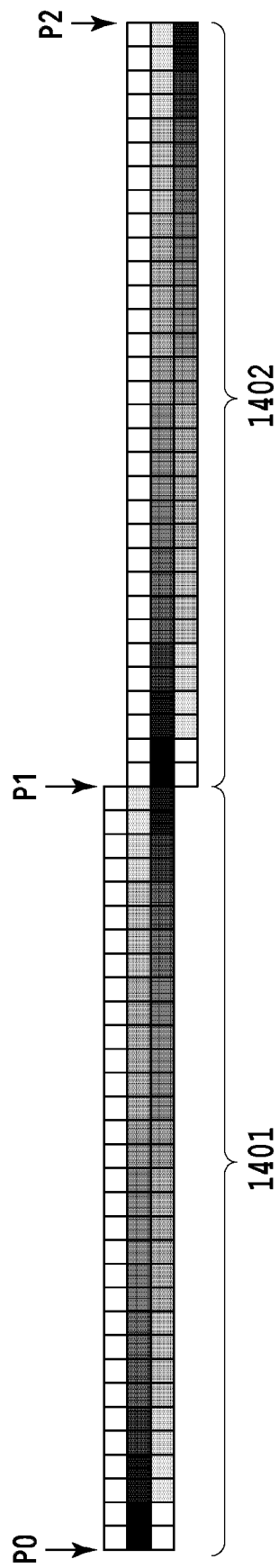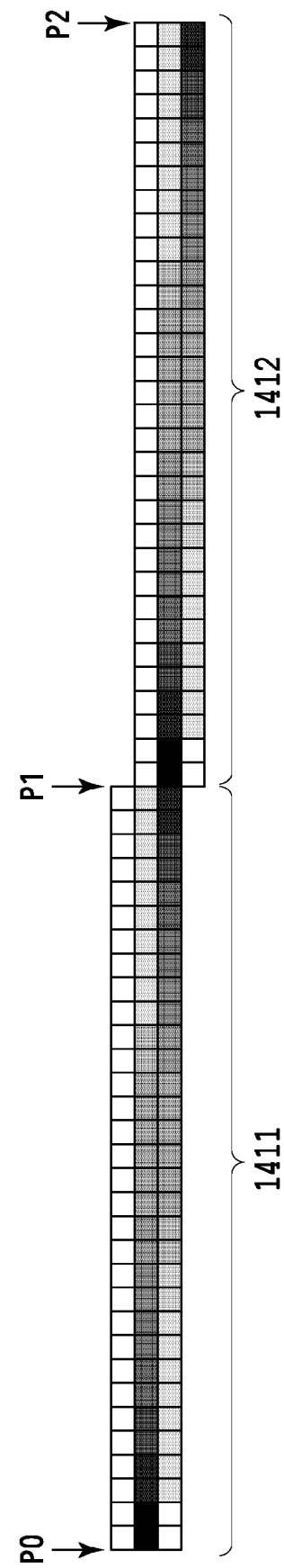
FIG.14A
FIG.14B

| x  | 1 | 2 | 3 | 4 | 5 | 6  | 7  | 8  | 9  | 10 | 11 | 12 | 13 | 14 | 15 | 16 |
|----|---|---|---|---|---|----|----|----|----|----|----|----|----|----|----|----|
| K2 | 6 | 5 | 5 | 5 | 4 | 4  | 3  | 2  | 0  | 0  | 0  | 0  | 0  | 0  | 0  | 0  |
| K0 | 6 | 7 | 7 | 8 | 9 | 10 | 12 | 14 | 15 | 14 | 12 | 10 | 9  | 8  | 7  | 7  |
| K1 | 0 | 0 | 0 | 0 | 0 | 0  | 0  | 0  | 0  | 2  | 3  | 4  | 4  | 5  | 5  | 5  |

FIG.15A

| x  | 1 | 2 | 3 | 4 | 5 | 6 | 7  | 8  | 9  | 10 | 11 | 12 | 13 | 14 | 15 | 16 |
|----|---|---|---|---|---|---|----|----|----|----|----|----|----|----|----|----|
| K2 | 5 | 5 | 4 | 3 | 2 | 2 | 2  | 2  | 0  | 0  | 0  | 0  | 0  | 0  | 0  | 0  |
| K0 | 5 | 5 | 6 | 7 | 8 | 9 | 11 | 13 | 15 | 13 | 11 | 9  | 8  | 7  | 6  | 5  |
| K1 | 0 | 0 | 0 | 0 | 0 | 0 | 0  | 0  | 0  | 2  | 2  | 2  | 2  | 3  | 4  | 5  |

FIG.15B

IMAGE FORMING APPARATUS, METHOD OF GENERATING IMAGE DATA THEREFOR AND STORAGE MEDIUM

BACKGROUND OF THE INVENTION

Field of the Invention

The present invention relates to a technique to deal with a registration shift and a color shift in an electrophotographic image forming apparatus.

Description of the Related Art

In an image forming apparatus adopting an electrophotographic method, such as a printer and a copy machine, it is known that a phenomenon called a so-called registration shift occurs, in which an inclination or a bend occurs in the laser scan line and the laser scan line shifts from an ideal state (straight line). This is caused by, for example, unevenness of a lens within a deflecting scanning unit, a shift in the attachment position, a shift in the assembly position of the deflecting scanning unit into the device main body, and the like. Further, in a printer that performs full color printing making use of toner of a plurality of colors (for example, CMYK), the degree of a bend of the scan line is different for each color, and therefore, a shift (color shift) occurs between color planes.

A variety of methods of dealing with a registration shift and a color shift have been proposed. For example, there is a method of forming an image by measuring the magnitudes of an inclination and a bend of the scan line by using an optical sensor and correcting a bitmap image so as to offset the shifts. Then, Japanese Patent Laid-Open No. 2006-143140 has disclosed a technique, premised on this technique, to change a coefficient used for image correction in accordance with environmental conditions, such as temperature and humidity.

Incidentally, there is an electrophotographic image forming apparatus having a high-quality mode as its operation mode, in which a more vivid tint or a deep tint is implemented by increasing the amount of toner corresponding to the color signal value of an input image compared to that at the normal time. However, there is a case where a sufficient correction effect is not obtained even by performing the above-described image correction in the high-quality mode similarly as in the case of the normal time. Consequently, an object of the present invention is to make it possible to obtain a sufficient correction effect also in the high-quality mode.

SUMMARY OF THE INVENTION

The image forming apparatus according to the present invention is an image forming apparatus having a first printing mode and a second printing mode whose development parameters are different from those of the first printing mode, and performing electrophotographic printing, the image forming apparatus including: at least one controller, having at least one processor which executes instructions stored in at least one memory, at least one circuitry or a combination of the at least one processor and the at least one circuitries, being configured to: perform scan line changing processing to shift an image in units of pixels in a sub scanning direction at a predetermined scan line changing point in a main scanning direction in accordance with characteristics of a laser scan line; and correct a tone level value of a pixel of interest in an image after the scan line changing processing by referring to a tone level value of an adjacent pixel neighboring the pixel of interest in a sub scanning direction, and the controller is configured to: perform the correction by using a correction coefficient set in which a pair of a correction coefficient to be applied to the pixel of interest and a correction coefficient to be applied to at least one of the adjacent pixels with respect to the pixel of interest in a sub scanning direction is associated with a variable specifying a relative position in a main scanning direction with the scan line changing point being taken as a start point; and use the different correction coefficient set between a case where printing is performed in the first printing mode and a case where printing is performed in the second printing mode.

Further features of the present invention will become apparent from the following description of exemplary embodiments with reference to the attached drawings.

BRIEF DESCRIPTION OF THE DRAWINGS

FIG. 6A and FIG. 6B are each a diagram showing an example of a correction coefficient set including two rows;

FIG. 7A to FIG. 7F are each a diagram showing a pulse width and a dot formed based on the pulse width;

FIG. 9 is a diagram showing an example of a pulse width conversion table;

FIG. 13A and FIG. 13B are each a diagram showing a part cut out from a halftone image corresponding to a partial section;

FIG. 14A is a diagram showing an example of an image after correction processing in the normal mode and FIG. 14B is a diagram showing an example of an image after correction processing in the high-quality mode according to the present embodiment; and FIG. 15A and FIG. 15B are each a diagram showing an example of a correction coefficient set including three rows.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

It is possible to widely apply measures against a registration shift and a color shift, to be explained in the present embodiment, to an image forming apparatus that performs electrophotographic printing, such as a copy machine, a laser printer, and a facsimile device. In the present embodiment, explanation is given by taking an MFP (Multi Function Peripheral) including a scan function, a print function, a copy function, a transmission function, and the like as an example.

<Hardware Configuration of Image Forming Apparatus>

Figure 1:
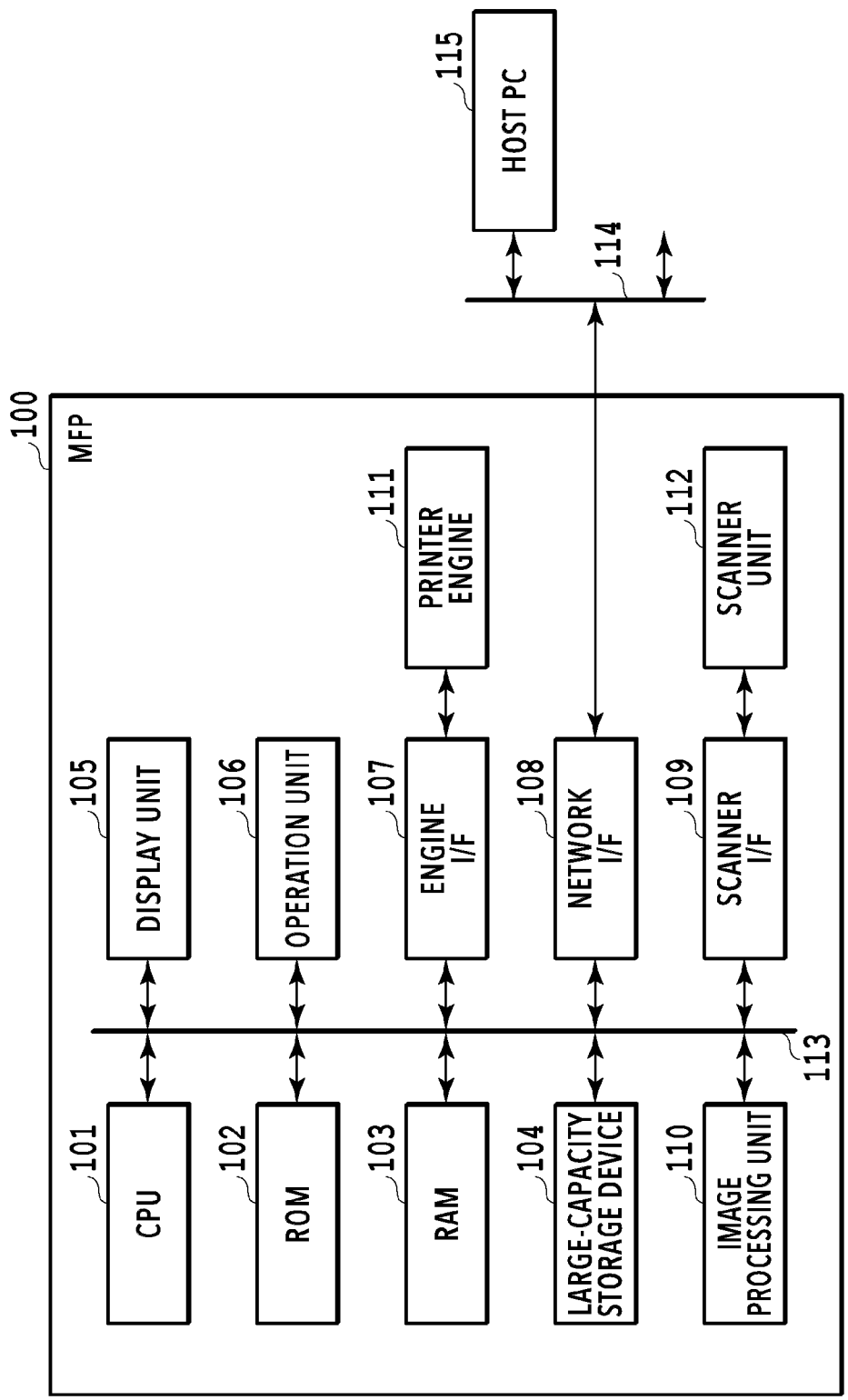
FIG. 1 is a block diagram showing a hardware configuration of an image forming apparatus.

FIG. 1 is a block diagram showing a hardware configuration of an MFP 100 according to the present embodiment. The MFP 100 includes a CPU 101, a ROM 102, a RAM 103, a large-capacity storage device 104, a display unit 105, an operation unit 106, an engine I/F 107, a network interface (I/F) 108, a scanner I/F 109, and an image processing unit 110. Each of these units is connected to one another via a system bus 113. Further, the MFP 100 also includes a printer engine 111 and a scanner unit 112. The printer engine 111 and the scanner unit 112 are connected to the system bus 113 via the engine I/F 107 and the scanner I/F 109, respectively. The image processing unit 110 may be configured as an image processing apparatus independent of the MFP 100.

The CPU 101 controls the operation of the entire MFP 100. The CPU 101 performs various kinds of processing, to be described later, by reading a program stored in the ROM 102 onto the RAM 103 and executing the program. The ROM 102 is a read only memory and stores a system boot program, a program for performing control of the printer engine, character data, character code information, and the like. The RAM 103 is a volatile random access memory and used as a work area of the CPU 101 and a temporary storage area of various kinds of data. For example, the RAM 103 is used as a storage area for storing font data additionally registered by download, image files received from an external device, and the like. The large-capacity storage device 104 is, for example, an HDD and an SSD and in which various kinds of data are spooled and which is used to store programs, information files, image data, and the like, or used as a work area.

The display unit 105 includes, for example, a liquid crystal display (LCD) and is used to display the setting state of the MFP 100, the situation of the processing being performed, the error state, and the like. The operation unit 106 includes hard keys and input devices, such as a touch panel, provided on the display unit 105 and receives an input (instructions) by the operation of a user. The operation unit 106 is used for changing the setting of the MFP 100, resetting the setting, and so on and also used for setting the operation mode (printing mode) of the MFP 100 at the time of performing image formation (printing).

The engine I/F 107 functions as an interface for controlling the printer engine 111 in accordance with instructions from the CPU 101 at the time of performing printing. Via the engine I/F 107, an engine control command or the like is transmitted and received between the CPU 101 and the printer engine 111. The network I/F 108 functions as an interface for connecting the MFP 100 to a network 114. The network 114 may be, for example, a LAN or the public switched telephone networks (PSTN). The printer engine 111 forms a multicolored image on a printing medium, such as paper, by using developers (toner) of a plurality of colors (here, four colors of CMYK) based on image data received from the system bus 113 side. The scanner I/F 109 functions as an interface for controlling the scanner unit 112 in accordance with instructions from the CPU 101 at the time of reading a document by the scanner unit 112. Via the scanner I/F 109, a scanner unit control command or the like is transmitted and received between the CPU 101 and the scanner unit 112. The scanner unit 112 reads an image of a document and generates image data by the control of the CPU 101 and transmits the image data to the RAM 103 or the large-capacity storage device 104 via the scanner I/F 109.

<Configuration of Image Processing Unit>

Figure 2:
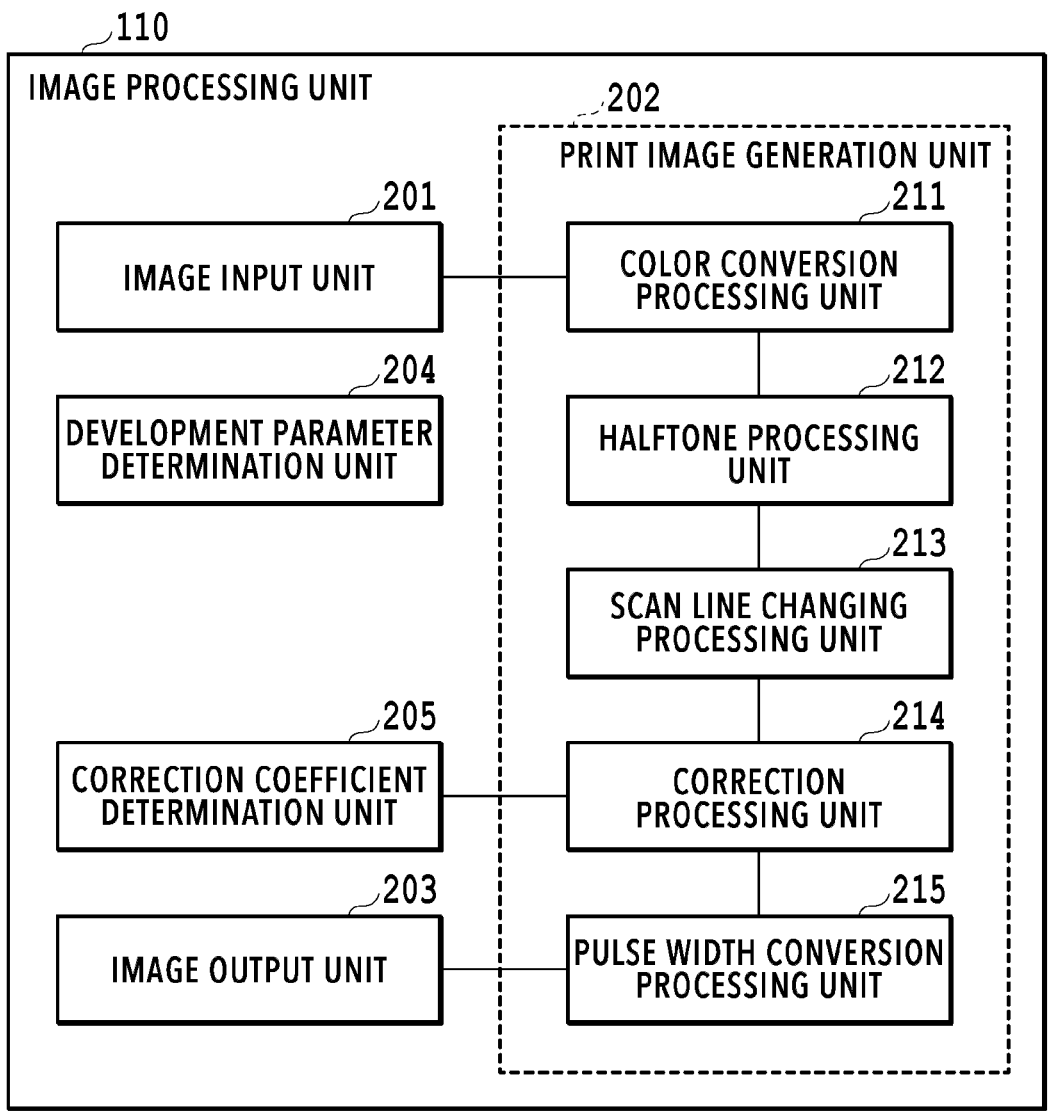
FIG. 2 is a function block diagram showing an internal configuration of an image processing unit.

FIG. 2 is a function block diagram showing the internal configuration of the image processing unit 110. The image processing unit 110 includes an image input unit 201, a print image generation unit 202, an image output unit 203, a development parameter determination unit 204, and a correction coefficient determination unit 205. Each of these function modules is implemented by the CPU 101 reading a program stored in the ROM 102 onto the RAM 103 and executing the program.

The image input unit 201 receives an input of image data to be printed. The image data that is input is, for example, image data in the bitmap format obtained by performing rasterize in the CPU 101 for PDL data received from a host PC 115. Alternatively, the image data that is input is image data in the bitmap format generated by the scanner unit 112. Further, the image data stored in the large-capacity storage device 104 or the ROM 102 may be input. The image data input to the image input unit 201 is sent to the print image generation unit 202.

The print image generation unit 202 includes a color conversion processing unit 211, a halftone processing unit 212, a scan line changing processing unit 213, a correction processing unit 214, and a pulse width conversion processing unit 215. The color conversion processing unit 211 converts a color space of input image data into a color space suitable to the printer engine 111. For example, in a case where the color space of input image data is RGB and the printer engine 111 is an engine that performs printing by using toner of each of CMYK, the color conversion processing unit 211 converts the color information in input image data from the RGB color space into the CMYK color space. The halftone processing unit 212 performs halftone processing for the image data represented by CMYK after the conversion, and converts the image into a halftone image with the number of tone levels that can be represented by the printer engine 111 (for example, two tone levels, four tone levels, 16 tone levels, and the like). It is possible to apply a variety of methods, such as a density pattern method, a systematic dither method, and an error diffusion method, to the halftone processing. The scan line changing processing unit 213 refers to information (hereinafter, called "profile") indicating characteristics of the laser scan line and performs processing (scan line changing processing) to shift the image data in the opposite direction by an amount corresponding to the shift of the actual scan line from a straight line (=ideal scan line) parallel to the rotation axis of a photoconductor drum. Specifically, the scan line changing processing unit 213 performs processing to shift the halftone image in units of pixels in the sub scanning direction at a predetermined position (scan line changing point) in accordance with the degree of inclination and bend indicated by the profile to thereby offset the shift of the laser scan line. The profile is created and stored in advance by measuring the magnitude of inclination and bend of the laser scan line by using an optical sensor. The correction processing unit 214 performs correction processing to correct a shift less than one pixel, which cannot be corrected by the scan line changing processing, by adjusting the tone level value of the image data after the scan line changing processing by the pixels before and after in the sub scanning direction by using the correction coefficient set in accordance with the printing mode. The correction coefficient set is a pair of the correction coefficient to be applied to the pixel of interest and the correction coefficient to be applied to at least one of the adjacent pixels neighboring the pixel of interest in the sub scanning direction associated with a variable specifying a relative position in the main scanning direction with the above-described scan line changing point being taken to be the start point. By this correction processing, an unnatural step that occurs in the scan line changing processing is eliminated. The pulse width conversion processing unit 215 performs processing to convert the image after the correction processing into a pulse signal having a pulse width corresponding to the level of the image signal by using a pulse width conversion table. Through the processing in each of these units, image data (print image data) that can be processed by the printer engine 111 is generated.

Upon receipt of print image data from the print image generation unit 202, the image output unit 203 transmits the print image data to the printer engine 111 via the engine I/F 107. The CPU 101 instructs the printer engine 111 to form an image based on the print image data. The printer engine 111 prints a color image in according with the input image on a printing medium by performing each process of exposure, development, transfer, and fixing.

The development parameter determination unit 204 determines the operation parameters (development parameters) at the time of development, such as the rotation speed of the development roller and the photoconductor drum configuring the printer engine 111 and the laser light quantity in accordance with the printing mode specified by a user. The correction coefficient determination unit 205 determines the correction coefficient set used in the correction processing in the above-described correction processing unit 214.

<Configuration of Printer Engine>

Figure 3:
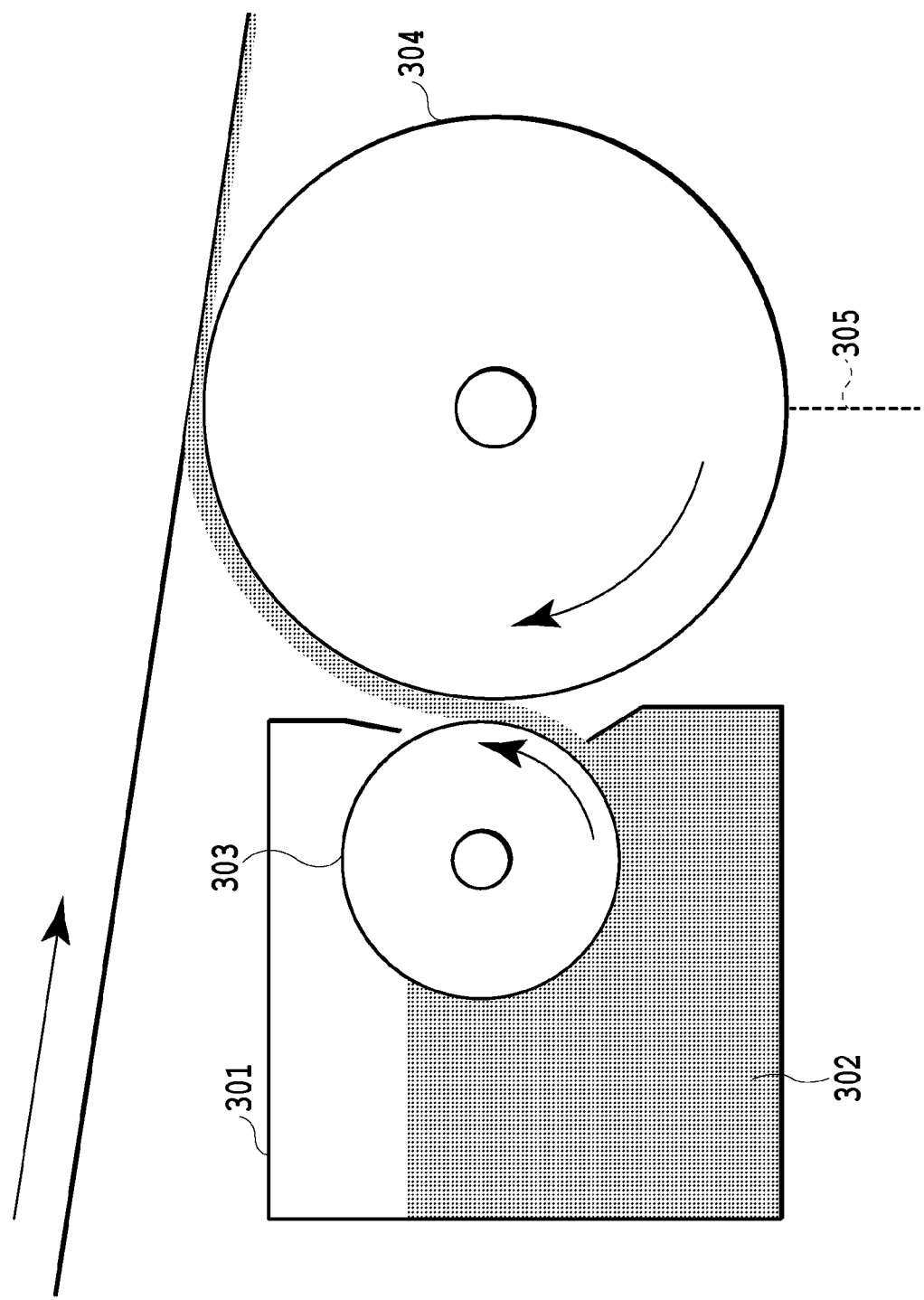
FIG. 3 is a diagram showing main configurations of a printer engine.

Following the above, the main configurations of the printer engine 111 are explained with reference to FIG. 3. The printer engine 111 includes a development counter 301 and a photoconductor drum 304 and forms an image on a printing medium by the process as follows. First, the surface of the photoconductor drum 304 is irradiated with a laser 305 and an electrostatic latent image is formed on the surface of the photoconductor 304. Following this, the development counter 301 attaches toner 302 in the form of a thin film to a development roller 303 and performs development of the electrostatic latent image formed on the surface of the photoconductor drum 304. In this manner, the image is transferred from the photoconductor drum 304 to the printing medium. A full color image forming apparatus that uses general toner of CMYK has a set of the development counter 301 and the photoconductor drum 304 for one kind of toner, that is, a total of four sets. That is, the above-described process is performed for each plane of CMYK and full color printing in accordance with the print image data is implemented.

Figure 4:
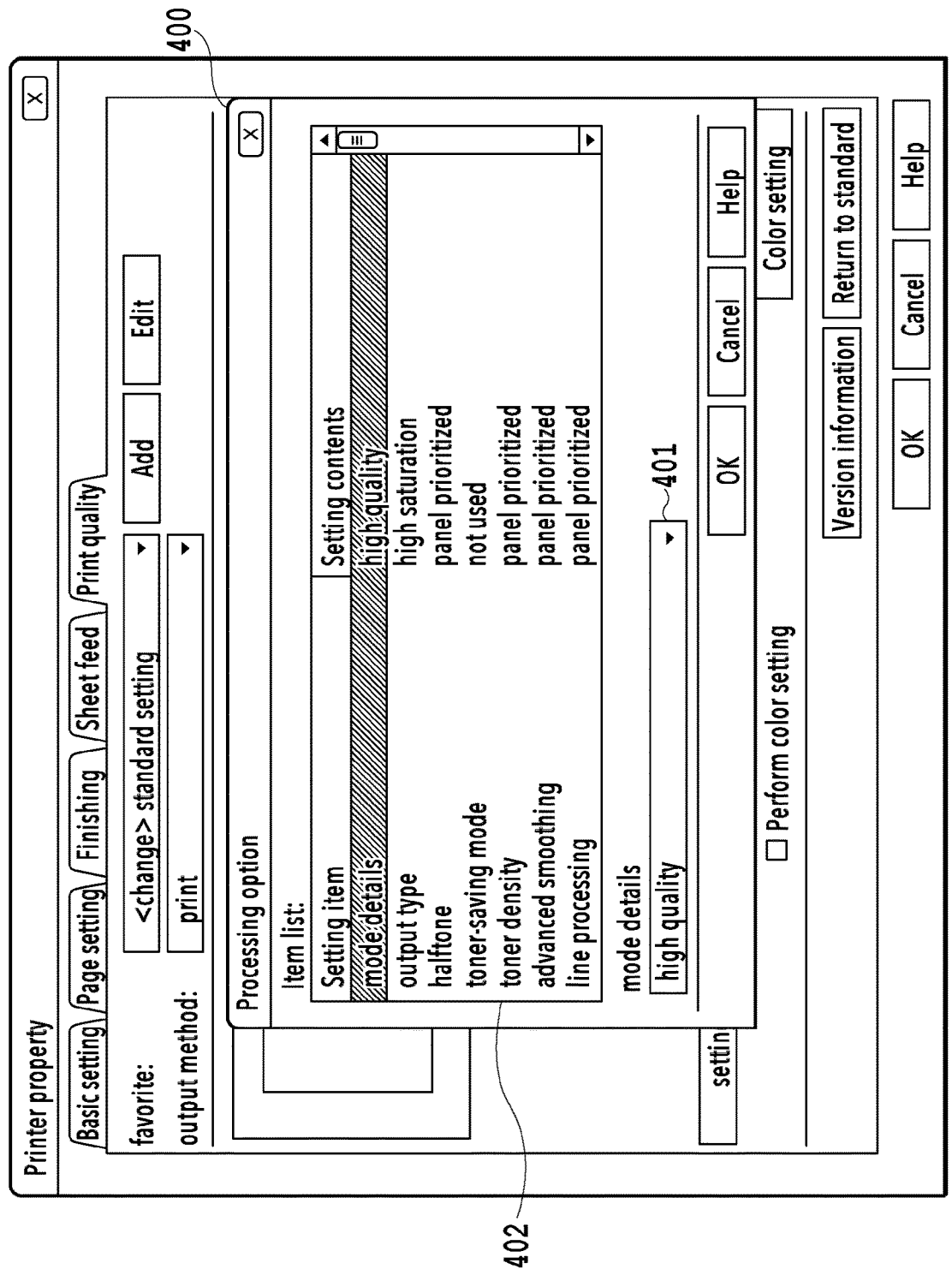
FIG. 4 is an example of a UI screen a user uses at the time of setting a printing mode via a printer driver.

Prior to the execution of the above-described process in each plane, in the development parameter determination unit 204, the development parameters described above are determined in accordance with the printing mode set via the printer driver of the host PC 115 or via the operation unit 106 of the MFP 100. FIG. 4 is an example of the UI screen a user uses at the time of setting the printing mode via the printer driver. In this example, by a user selecting "high quality" in a printing mode selection field 401 within a "Processing option" window 400, an "output type" item is determined to be "high saturation". In the present embodiment, full color printing using the toner of the four CMYK is supposed. Because of this, the output type that extends the color gamut by using a more amount of toner than that at the normal time for a predetermined color signal value is represented as "high saturation". However, in place of "high saturation", there may be a representation, for example, such as "high density" and "vivid". Further, in a case of monochrome printing using only K toner, it may also be possible to use a representation, for example, such as "pitch-dark" representing deeper black. It may also be possible for the MFP 100 side to display a similar UI screen, for example, on the display unit 105 and to cause a user to specify the printing mode. However, in a case where the printing mode (output type) is set via the printer driver of the host PC 115, priority is given to the printing mode setting via the printer driver over the printing mode setting performed in the MFP 100.

Then, in accordance with the development parameters determined in accordance with the mode selection by a user, the rotation speed (circumferential speed) of the development roller 303 and/or the photoconductor drum 304 is controlled. For example, in a case where the printing mode is not specified particularly and the output type is "normal" in the default state, control is performed so that the circumferential speed of the development roller 303 and that of the photoconductor drum 304 are equal to each other. On the other hand, in a case where the printing mode is set to "high quality" and the output type becomes "high saturation", control is performed so that the speed of the development roller 303 is kept as it is (the same as that at the normal time) and the rotation speed of the photoconductor drum 304 is reduced to half the rotation speed. Due to this, the laser light quantity with which the unit area is irradiated increase compared to that in a case of "normal". In this manner, in a case where the output type is set to "high saturation", by increasing the ratio (circumferential speed ratio) of the rotation speed of the development roller 303 to that of the photoconductor drum 304, the laser light quantity per unit area is increased so that a more amount of charge is accumulated on the surface of the photoconductor drum 304. In this manner, in a case where the output type is "high saturation", by transferring more toner per pixel to the photoconductor drum 304 from the development roller 303, the saturation of each color of CMYK is increased. Then, in a case where the saturation of each color of CMYK is increased, the saturation of a color (mixed color) combining these colors is also increased, and as a result, the color gamut that can be represented on printed matter extends.

<Review of Problems to be Solved>

Before detailed explanation of the image correction processing aiming at suppression of a registration shift and a color shift according to the present embodiment is given, problems to be solved in the present embodiment that premises full color printing are reviewed.

The image correction processing aiming at suppression of a registration shift and a color shift is roughly classified into correction in units of pixels and correction of less than one pixel. The correction in units of pixels is the correction processing to shift the pixel of a bitmap image in the sub scanning direction in units of pixels based on the inclination and bend of the laser scan line and is the same as the scan line changing processing described previously. The position at which a pixel is shifted is called a "scan line changing point". On the other hand, the correction of less than one pixel is the processing to adjust the tone level value of the pixel of interest of a bitmap image by the tone level value of the adjacent pixel with respect to the pixel of interest in the sub scanning direction and the correction processing referred to in the present embodiment refers to this processing. By performing correction of less than one pixel, an unnatural step at the scan line changing point boundary, which occurs by the scan line changing processing, is eliminated.

First, a case where the printing mode is the normal mode is explained as an example.

Figure 5A:
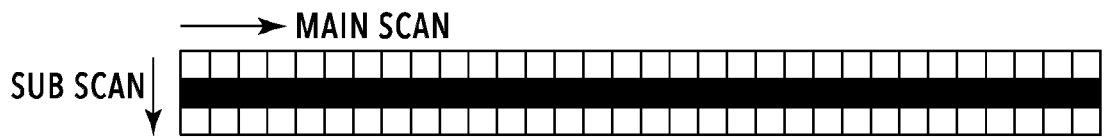
FIG. 5A is a diagram showing a part of an input image.
Figure 5B:
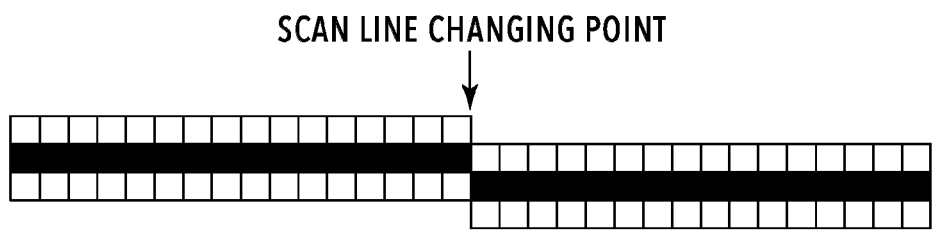
FIG. 5B is a diagram showing an image after scan line changing processing.
Figure 5C:
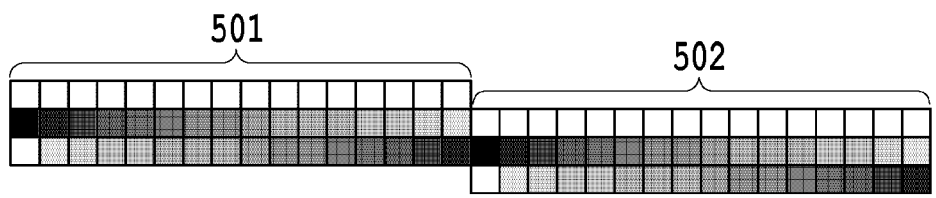
FIG. 5C is a diagram showing an image after correction processing.
Figure 5D:
FIG. 5D is a diagram showing an image after pulse width conversion processing.
Figure 5E:
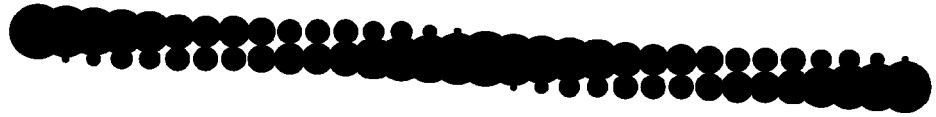
FIG. 5E is a diagram showing exposure results in a normal mode.

FIG. 5A is a part of an input image and shows an image block in which 32 pixels are arranged side by side in the main scanning direction and three pixels are arranged one on top of another in the sub scanning direction. In FIG. 5A, the black pixel in the middle row represents the pixel of the maximum tone level value and the white pixel in the upper row and in the lower row represents the pixel of the minimum tone level value. Then, FIG. 5B shows the results of performing the scan line changing processing for the image block shown in FIG. 5A. It is known that the image block shifts downward by an amount corresponding to one pixel along the sub scanning direction at the position of the scan line changing point. Then, FIG. 5C shows the results of performing the correction of lass than one pixel by using the correction coefficient set shown in FIG. 6A for the image block after the scan line changing processing shown in FIG. 5B. The correction coefficient set shown in FIG. 6A includes two kinds of correction coefficient, that is, K0 and K1, to be applied to one of the pixel of interest and the adjacent pixel with respect to the pixel of interest in accordance with the direction of the bend indicated by the profile. Then, by a variable x specifying the relative position in the main scanning direction, a different correction coefficient is applied. Although the determination method of the variable x will be described later, the variable x is determined by the pixel position between the adjacent scan line changing points (pixel position in the main scanning direction in the image area demarcated by two scan line changing points) and the number of pixels in the main scanning direction between the adjacent scan line changing points. Here, by finding a weighted average of the tone level value of the pixel of interest and the tone level value of the upper adjacent pixel with respect to the pixel of interest in the sub scanning direction by using the correction coefficient and by replacing the tone level value of the pixel of interest with the obtained value, the image block after the correction in FIG. 5C is obtained. In each of a half image block 501 on the left and a half image block 502 on the right, it is known that the pixel in the middle row gradually changes to a paler color toward the main scanning direction and on the contrary, the pixel in the lower row gradually changes to a darker color. Then, the state after the pulse width conversion is performed for each pixel in the image block after the correction shown in FIG. 5C is FIG. 5D. The exposure results based on the data after the pulse width conversion shown in FIG. 5D is FIG. 5E. In this manner, a line whose inclination is corrected is formed.

Next, a problem that may occur in a case where the printing mode is the high-quality mode is explained. In the high-quality mode, as described previously, by changing the development parameters, the maximum density of toner is increased compared to that in the normal mode and thus the color gamut that can be reproduced is extended. In a case of full color printing, in each plane of CMYK, by increasing the maximum value of the toner amount to be attached to one pixel, the saturation of each color is increased. Consequently, in the high-quality mode, in order to increase the maximum toner amount of each color of CMYK, by performing control to increase the maximum value of the laser light quantity and to change the circumferential speed ratio of the photoconductor drum and the development roller, toner more than that at the normal time is supplied per pixel. Due to this, even in a case of a dot represented by the same tone level value on the image data, the size of one dot on a sheet is different between the normal mode and the high-quality mode. FIG. 7A shows a pulse width (upper) corresponding to one dot (=sixteen-sixteenths pixel) in the normal mode and a dot (lower) formed on a sheet in accordance with the pulse width. Then, FIG. 7B shows a pulse width (upper) corresponding to one dot (=sixteen-sixteenth pixel) in the high-quality mode and a dot (lower) formed on a sheet in accordance therewith.

Further, also in a case where a dot is less than one pixel, the size of the dot is different between the normal mode and the high-quality mode. FIG. 7C shows a pulse width (upper) corresponding to a six-sixteenths pixel in the normal mode and a dot (lower) formed on a sheet in accordance with the pulse width. Then, FIG. 7D shows a pulse width (upper) corresponding to a six-sixteenths pixel in the high-quality mode and a dot (lower) formed on a sheet in accordance with the pulse width. Further, the degree of influence in a case where two dots less than one pixel after the correction processing are arranged one on top of another in the sub scanning direction is high in the high-quality mode compared to that in the normal mode. FIG. 7E shows a pulse width (upper) in a case where two six-sixteenths pixels are arranged one on top of another in the sub scanning direction in the normal mode and a dot (lower) formed on a sheet in accordance with the pulse width. Then, FIG. 7F shows a pulse width (upper) in a case where two six-sixteenths pixels are arranged one on top of another in the high-quality mode and a dot (lower) formed on a sheet in accordance with the pulse width.

Figure 5F:
FIG. 5F is a diagram showing exposure results in a conventional high-quality mode.

Here, it is assumed that the size of one dot (FIG. 7A) on the sheet in the normal mode is approximately the same as that of the dot (FIG. 7E) of two six-sixteenths pixels arranged one on top of another in the sub scanning direction. In this case, on a condition that the development parameters in the high-quality mode are applied to the same color signal value, the dot (FIG. 7F) of two six-sixteenth pixels arranged one on top of another in the sub scanning direction is larger in the sub scanning direction than the one dot (FIG. 7B) on the sheet in the high-quality mode. As a result of this, in a case where the color signal value that is the same as that in the normal mode is output with the development parameters in the high-quality mode, as shown in FIG. 5F, in the dot line that is formed, a bulge occurs in the vicinity of the center between the scan line changing points and the thickness becomes uneven. Consequently, an object of the present embodiment is to prevent the thickness of a dot line to be formed from becoming uneven by changing the correction coefficient used for correction processing in accordance with the development parameters in the printing mode to be used.

<Print Image Data Generation Processing>

Figure 8:
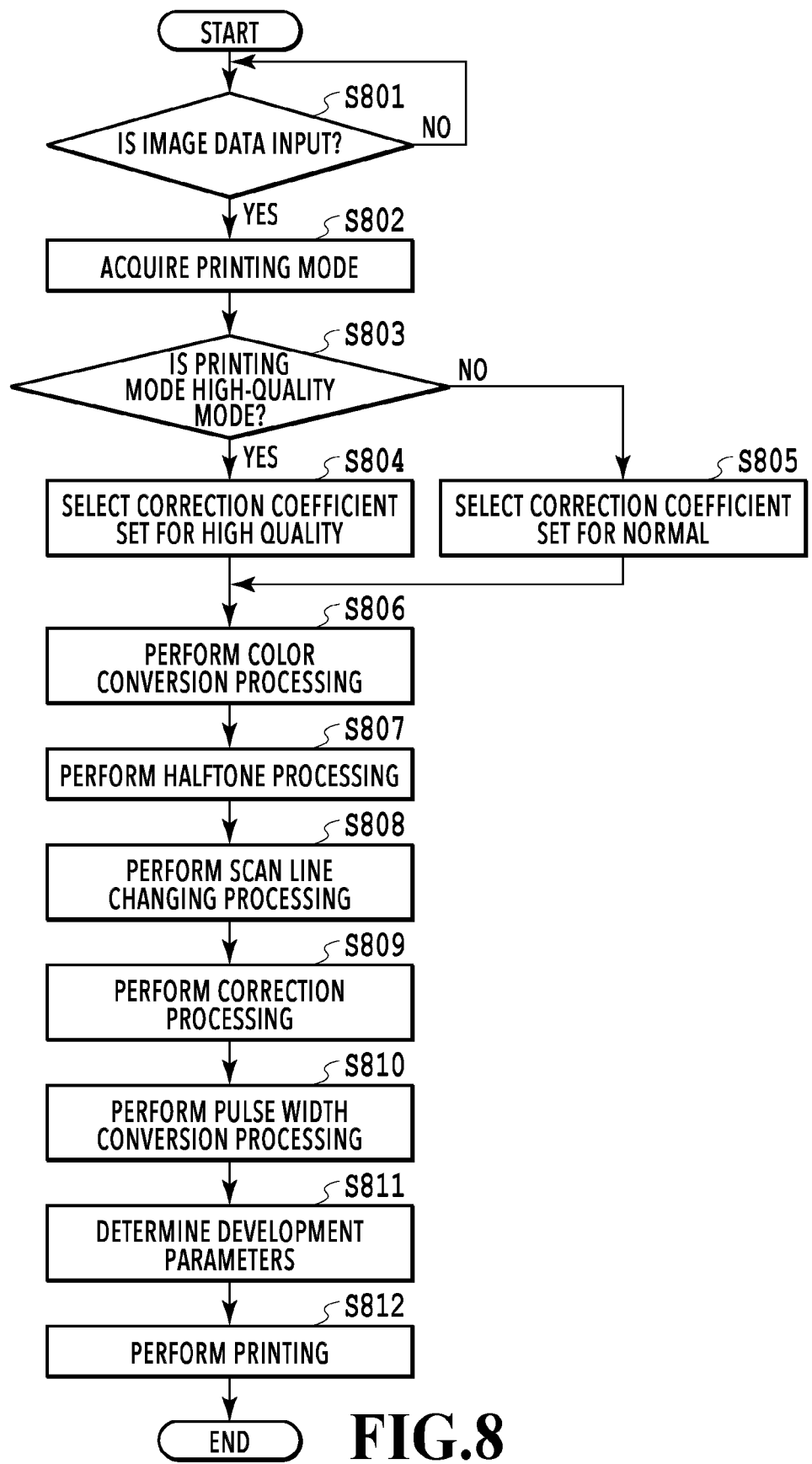
FIG. 8 is a flowchart showing a flow of processing in the image processing unit.

Generation processing of print image data according to the present embodiment in order to solve the above-described problems is explained. FIG. 8 is a flowchart showing a flow of processing in the image processing unit 110. The series of processing shown in the flow in FIG. 8 is implemented by the CPU 101 reading a program stored in the ROM 102 onto the RAM 103 and executing the program. In the following explanation, symbol "S" indicates a step.

S801 is processing to monitor whether or not image data is input by the image input unit 201. In a case where printing-target image data is input, the processing advances to S802. Here, explanation is advanced by taking a case as an example where part of the input image data is configured by a black pixel line and a white pixel line as in FIG. 5A. In this case, it is assumed that in the color signal value of the input image data, each of RGB is represented by eight bits (that is, the black pixel arranged side by side in the main scanning direction has the color signal value in which R=0, G=0, and B=0 and the white pixel has the color signal value in which R=255, G=255, and B=255).

At S802, the correction coefficient determination unit 205 acquires information on the printing mode to be applied to the input image. For example, in a case where the printing mode is specified via the printer driver of the host PC 115 together with printing instructions, information on the printing mode is transmitted as part of the input image data (or attached thereto), and therefore, the correction coefficient determination unit 205 acquires the information. In a case where the printing mode is specified by the operation unit 106 of the MFP 100, the correction coefficient determination unit 205 acquires the information on the specified printing mode from the RAM 102 or the like. At S803 that follows, the processing is branched in accordance with whether the acquired printing mode is the high-quality mode or the normal mode. In a case of the high-quality mode, the processing advances to S804 and in a case of the normal mode, the processing advances to S805.

At S804, the correction coefficient determination unit 205 selects the correction coefficient set for the high-quality mode from among a plurality of correction coefficient sets prepared in advance and determines the set as the correction coefficient set to be applied to correction processing (S809), to be described later. In FIG. 6B, an example of the correction coefficient set for the high-quality mode is shown. By a comparison with the correction coefficient set for the normal mode in FIG. 6A, it is known that the total value of the correction coefficients specified by the pair of K0 and K1 at the center portion in the range of the variable x is smaller. The meaning of this will be described later. The correction coefficient determination unit 205 stores data of the determined correction coefficient set for the high-quality mode in the RAM 103. Similarly, at S805, the correction coefficient determination unit 205 selects the correction coefficient set for the normal mode (see FIG. 6A) from among a plurality of correction coefficient sets prepared in advance and determines the set as the correction coefficient set to be applied to correction processing (S809), to be described later. The correction coefficient determination unit 205 stores data of the determined correction coefficient set for the normal mode in the RAM 103.

At S806, the color conversion processing unit 211 converts the 8-bit RGB values, which are the color signal values of the input image, into 8-bit CMYK values corresponding to the toner of each of CMYK. Here, explanation is advanced on the assumption that (R, B)=(0, 0, 0) is converted into (C, M, Y, K)=(0, 0, 0, 255). In a case of (R, B)=(0, 0, 0), this may be converted into mixed values of each color of CMYK, such as (C, M, Y, K)=(85, 85, 85, 255).

At S807, the halftone processing unit 212 converts the image for which the color conversion processing has been performed (image after color conversion) into an image represented by halftone dots (halftone image) by performing halftone processing. Here, explanation is advanced on the assumption that quantization is performed from 256 tone levels into 16 levels and conversion is performed into (C, M, Y, K)=(0, 0, 0, 15). Quantization may be one into four tone levels or two tone levels.

At S808, the scan line changing processing unit 213 performs scan line changing processing for the halftone image. Details of the scan line changing processing will be described later.

At S809, the correction processing unit 214 performs correction processing by using the correction coefficient set determined at S804 or S805 described above for the halftone image for which the scan line changing processing has been performed. Details of the correction processing will be described later.

At S810, the pulse width conversion processing unit 215 performs pulse width conversion processing for the halftone image for which the correction processing has been performed (corrected image). In this pulse width conversion processing, a pulse width conversion table as shown in FIG. 9 is used. In the pulse width conversion table in FIG. 9, 4-bit input pixel values (tone level values) of 0 to 15 and 16-bit output values (pulse signal values) representing the pulse width are associated with each other and one pixel is divided into 16 kinds of pulse width. Which number of kinds of pulse width one pixel is divided into is arbitrary and the number of divisions is not limited to 16. Further, the pulse width conversion table is common to the printing modes and is created in advance and stored in the ROM 102 or the large-capacity storage device 104 and read at the time of processing. In the pulse width conversion table in FIG. 9, for example, in a case where the pixel value in a corrected image is "6", the pulse signal value after conversion is "0x0FE0". The pulse signal data obtained by the pulse width conversion processing is sent to the printer engine 111 through the engine I/F 107.

At S811, the development parameter determination unit 204 determines development parameters in accordance with the printing mode. Specifically, in accordance with the printing mode acquired at S802, the rotation speed of each of the development roller 303 and the photoconductor drum 304, which is an image carrier, and the light quantity of the laser 305 are determined. In the present embodiment, in a case where the printing mode is the normal mode, for example, the circumferential speed ratio between the development roller 303 and the photoconductor drum 304 is determined to be 1:1 and the light quantity of the laser 305 is determined to be the standard value, respectively. Further, in a case where the printing mode is the high-quality mode, for example, the circumferential speed ratio between the development roller 303 and the photoconductor drum 304 is determined to be 1:2 and the light quantity of the laser 305 is determined to be 1.5 times the standard value, respectively. Information on the determined development parameters is sent to the printer engine 111.

Figure 10A:
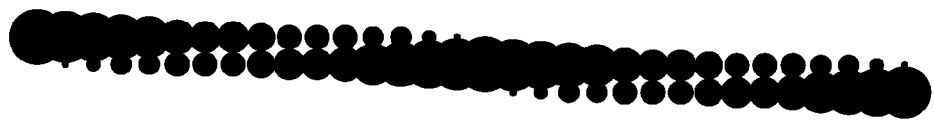
FIG. 10A is a diagram showing exposure results in the normal mode and FIG. 10B is a diagram showing exposure results in the high-quality mode according to the present embodiment.
Figure 10B:

At S812, the printer engine 111 performs printing processing. That is, the printer engine 111 performs a laser scan in accordance with the pulse signal data generated at S810 and the development parameters determined at S811 and forms a latent image having gradation characteristics due to a change in dot area on the photoconductor drum 304. After this, through the process, such as transfer and fixing, the printing processing is completed. In an image printed in the normal mode, a line whose thickness is even as shown in FIG. 10A is formed. Further, also in an image printed in the high-quality mode, a line whose dot diameter is large and whose thickness is even is formed by using more toner as shown in FIG. 10B.

The above is the contents of the print image data generation processing according to the present embodiment.

<Scan Line Changing Processing>

Following the above, details of the scan line changing processing (S808) in the scan line changing processing unit 213 are explained. First, with reference to the profile described previously, the scan line changing point is determined. The characteristics of the scan line are different for each printer engine and further, in a case of an image forming apparatus that forms a color image by using a plurality of kinds of color (toner), the characteristics are different for each color. Consequently, the profile is prepared for each printer engine and further, prepared in accordance with the number of kinds of toner to be included. FIG. 11A to FIG. 11D are each an example of the profile in the present embodiment and the horizontal axis represents the main scanning position (width to be scanned) and the vertical axis represents a shift amount in the sub scanning direction for the ideal characteristics with no inclination or bend. In FIG. 11A to FIG. 11D, a straight line 1100 extending in the main scanning direction indicates the ideal characteristics with no bend. Then, a curve 1101 indicates the characteristics of K toner, a curve 1102 indicates the characteristics of Y toner, a curve 1103 indicates the characteristics of M toner, and a curve 1104 indicates the characteristics of C toner, respectively. The change point of the curve is different for each color and the difference between toner and toner appears in an image after fixing as a registration shift.

Figure 11A:
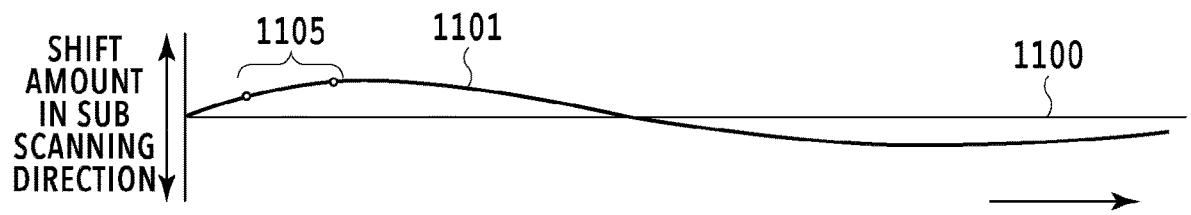
FIG. 11A to FIG. 11D are each a diagram showing an example of a profile corresponding to each color of CMYK.
Figure 11B:
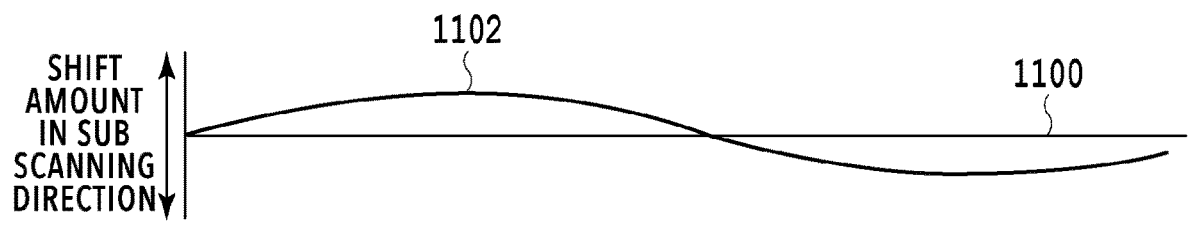
Figure 11C:
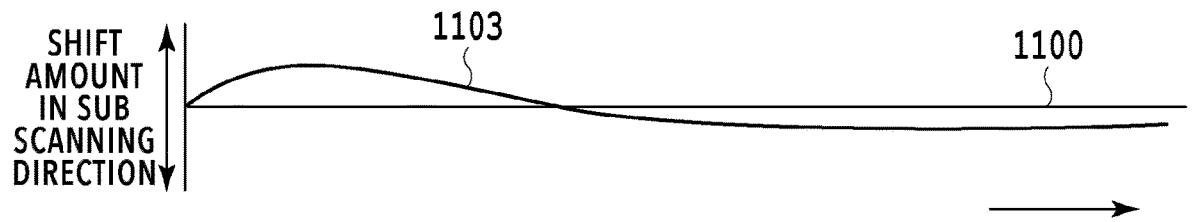
Figure 11D:
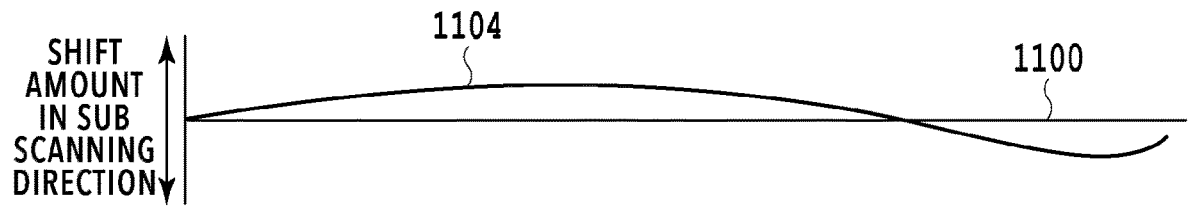
Figure 12:
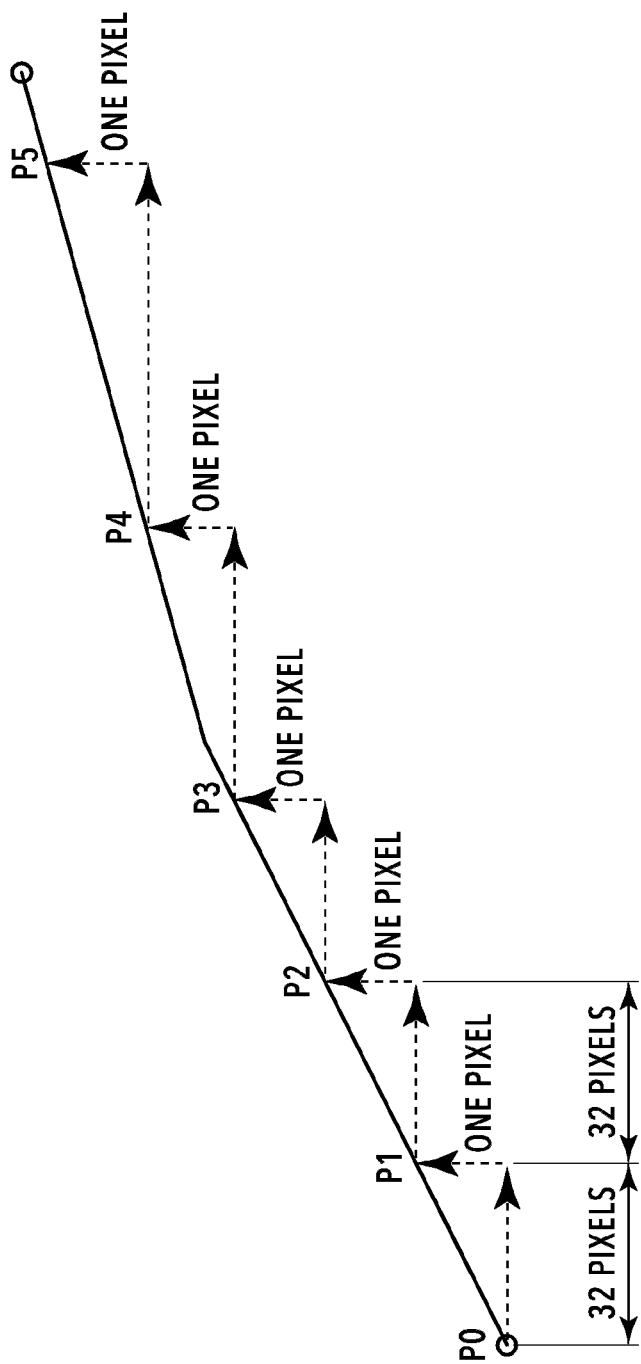
FIG. 12 is an enlarged diagram of a partial section cut out from the profile.

FIG. 12 is an enlarged diagram of a partial section 1105 cut out from the profile 1101 of the K toner shown in FIG. 11A. In this partial section 1105, it is known that the shift gradually becomes larger in the upward direction for the straight line 1100, the ideal scan line characteristics, toward the main scanning direction. The scan line changing processing offsets the actual shift of the scan line for the ideal scan line by shifting the image by an amount corresponding to the shift in the opposite direction. Because of this, as shown in FIG. 12, the image is shifted (offset) vertically in units of pixels along the sub scanning direction in accordance with the magnitude (degree) of the inclination and bend. In FIG. 12, P0 indicates the start point position of the partial section 1105 and P1 to P5 indicate the positions (=scan line changing points) at which the image is shifted by one pixel. Here, it is assumed that there are 32 pixels both between the start point position P0 and the scan line changing point P1 and between the scan line changing point P1 and the scan line changing point P2. In a case where the long side of the A4 sheet is taken to be the main scanning direction and the print resolution is taken to be 600 dpi, the number of pixels in the main scanning direction is 7,016. Then, FIG. 13A and FIG. 13B each show an image block of 64 pixels×3 pixels obtained by cutting out a part of the halftone image (white pixel:tone level value=0, black pixel: tone level value=15) corresponding to the partial section 1105. FIG. 13A is the image block before the scan line changing and FIG. 13B is the image block after the scan line changing. In FIG. 13B, it is known that the image block is shifted downward by an amount corresponding to one pixel in the sub scanning direction at the position of P1 in order to offset the bend in the upward direction.

<Correction Processing>

Following the above, the correction processing (S809) using the correction coefficient set described above is explained. The correction processing unit 214 reads the correction coefficient set in accordance with the printing mode from the RAM 103 and corrects the tone level value of each pixel by applying a predetermined correction coefficient to each pixel of the halftone image for which the scan line changing processing described previously has been performed. The predetermined correction coefficient is determined for each pixel in accordance with the variable x specifying the relative position in the main scanning direction between the scan line changing points.

First, the variable x in the correction coefficient set for determining the correction coefficient to be applied to the pixel of interest is found by equation (1) below.

$$x=(\text{pixel position between adjacent scan line changing points})\times N\div(\text{number of pixels between adjacent scan line changing points}) \quad \text{equation (1)}$$

In equation (1) described above, "N" represents a range the variable x can take in the correction coefficient sets in FIG. 6A and FIG. 6B and in a case of the present embodiment where x=1 to 16, "N" is "16. In a case where the range of the variable x is set large, it is made possible to perform more accurate correction control, but the arithmetic operation load increases accordingly, and therefore, it is better to determine the range by taking into consideration the balance therebetween. The result of the arithmetic operation by equation (1) described above is rounded to the nearest integer. It may also be possible to prepare correction coefficient sets different for each color of CMYK.

Then, a tone level value V_corr of the pixel of interest after the correction processing is calculated by equation (2) or equation (3) below in accordance with the shift direction in the scan line changing processing. In each equation, the result is rounded off to the nearest integer. Each tone level value V_corr is as follows.

Downward Shift in the Sub Scanning Direction $$V\_\text{corr}=\{K0(x)\times(\text{tone level value of pixel of interest})+K1(x)\times(\text{tone level value of upper adjacent pixel with respect to pixel of interest})\}\div15 \quad \text{equation (2)}$$

Upward Shift in the Sub Scanning Direction $$V\_\text{corr}=\{K1(x)\times(\text{tone level value of pixel of interest})+K0(x)\times(\text{tone level value of upper adjacent pixel with respect to pixel of interest})\}\div15 \quad \text{equation (3)}$$

In the following, the correction processing for the halftone image for which the scan line changing processing has been performed downward in the sub scanning direction is explained with reference to FIG. 13B. First, the correction processing in a case where the correction coefficient set for the normal mode is used is explained.

Here, it is assumed that the pixel of interest is the leftmost pixel in the black pixel line in an image block 1301 in FIG. 13B. From the leftmost pixel, the pixel value V_corr after the correction is calculated in order by using the correction coefficient set in FIG. 6A in accordance with equation (2) described above.

First, as shown in FIG. 13B, the number of pixels in the main scanning direction between two adjacent scan line changing points (P0 and P1, P1 and P2) is 32 as shown in FIG. 13B. Consequently, the variable x in a case where the pixel of interest is the leftmost black pixel is calculated as x=1×16÷32=0.5 by equation (2) described above. However, this is rounded off to the nearest integer, and therefore, x is calculated as x=1. The variable x in a case where the next pixel to the right is the pixel of interest is calculated as x=2×16÷32=1. Further, the variable x in a case where the next pixel to the right is the pixel of interest is calculated as x=3×16÷32=1.5 and this is rounded off to the nearest integer, and therefore, x is calculated as x=2. Further, the variable x in a case where the next pixel to the right is the pixel of interest is calculated as x=4×16÷32=2. Further, the variable x in a case where the next pixel to the right is the pixel of interest is calculated as x=5×16÷32=2.5 and this is rounded off to the nearest integer, and therefore, x is calculated as x=3. Further, the variable x in a case where the next pixel to the right is the pixel of interest is calculated as x=6×16÷32=3. In this manner, the variable x for the 32 black pixels arranged side by side in the middle row of the image block 1301 in FIG. 13B changes in units of two pixels. This case means that the same correction coefficient is applied to the two adjacent pixels arranged side by side in the main scanning direction. In a case where the number of pixels between two adjacent scan line changing points is 64, the variable x changes in units of four pixels and the same correction coefficient is applied to the four successive pixels arranged side by side in the main scanning direction.

Then, in accordance with the correction coefficient determined based on the variable x determined as described above, the tone level value of each black pixel is corrected. First, the correction coefficient in a case where the variable x=1 is K0 (1)=15 and K1 (1)=0 from FIG. 6A. Here, the tone level value of the pixel of interest is 15 and the tone level value of the upper adjacent pixel is 0, and therefore, the tone level value of the pixel of interest after the correction is calculated as V_corr=(15×15+0×0)÷15=15 from equation (2) described above. Next, the correction coefficient in a case where the variable x=2 is K0 (0)=14 and K1 (0)=2. The tone level value of the pixel of interest is 15 and the tone level value of the upper adjacent pixel is 0, and therefore, the tone level value of the pixel of interest after the correction is calculated as V_corr=(14×15+2×0)÷15=14 from equation (2) described above. The processing such as this is repeated the number of times corresponding to 32 pixels up to the next scan line changing point (here, P1). The pixel value after the correction of each pixel corresponding to the variable x in the black pixel line of the image block 1301 is as follows.

TABLE 1

| | x | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| V_corr | 15 | 14 | 12 | 10 | 9 | 8 | 7 | 7 | 6 | 5 | 5 | 5 | 4 | 4 | 3 | 2 |

Then, in a case where the rightmost pixel in the black pixel line in the target image block is reached, the same processing is performed for the white pixel line one line below.

First, the correction coefficient in a case where the variable x=1 is K0 (1)=15 and K1 (1)=0 from FIG. 6A. Here, the tone level value of the pixel of interest is 0 and the tone level value of the upper adjacent pixel is 15, and therefore, the tone level value of the pixel of interest after the correction is calculated as V_corr=(15×0+0×15)÷15=0 from equation (2) described above. Next, the correction coefficient in a case where the variable x=2 is K0 (0)=14 and K1 (0)=2 from FIG. 6A. The tone level value of the pixel of interest is 0 and the tone level value of the upper adjacent pixel is 15, and therefore, the tone level value of the pixel of interest after the correction processing is calculated as V_corr=(14×0+2×15)÷15=2 from equation (2) described above. The processing such as this is repeated the number of times corresponding to 32 pixels up to the next scan line changing point (here, P1). The pixel value after the correction of each pixel corresponding to the variable x in the white pixel line in the lower row of the image block 1301 is as follows.

TABLE 2

| | x | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| V_corr | 0 | 2 | 3 | 4 | 4 | 5 | 5 | 5 | 6 | 7 | 7 | 8 | 9 | 10 | 12 | 14 |

Then, in a case where the processing for each pixel of the image block 1301 demarcated by P0 and P1 is completed, then, processing whose target is an image block 1302 demarcated by next P1 and P2 is performed. As a result of the correction processing such as this, an image as shown in FIG. 14A is obtained. An image block 1401 corresponds to the image block 1301 in FIG. 13B and an image block 1402 corresponds to the image block 1302 in FIG. 13B, respectively.

Then, in a case where the same correction processing is performed by using the correction coefficient set for the high-quality mode in FIG. 6B, the results will be as follows.

First, the pixel value after the correction of each pixel corresponding to the variable x in the black pixel line of the image block 1301 is as in Table 3 below.

TABLE 3

| | x | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| V_corr | 15 | 13 | 11 | 9 | 8 | 7 | 6 | 5 | 5 | 5 | 4 | 3 | 2 | 2 | 2 | 2 |

Then, in a case where the rightmost pixel in the black pixel line in the target image block is reached, the same processing is performed for the white pixel line one line below. The pixel value after the correction of each pixel corresponding to the variable x in the white pixel line in the lower row of the image block 1301 is as follows.

TABLE 4

| | x | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| V_corr | 0 | 2 | 2 | 2 | 2 | 3 | 4 | 5 | 5 | 5 | 6 | 7 | 8 | 9 | 11 | 13 |

Then, in a case where the processing for each pixel of the image block 1301 demarcated by P0 and P1 is completed, then, processing whose target is the image block 1302 demarcated by next P1 and P2 is performed.

As a result of the correction processing such as this, an image as shown in FIG. 14B is obtained. An image block 1411 in FIG. 14B corresponds to the image block 1301 in FIG. 13B and an image block 1412 in FIG. 14B corresponds to the image block 1302 in FIG. 13B, respectively.

A large difference between the image after the correction in FIG. 14A and the image after the correction in FIG. 14B lies in that the tone level values of the pixel group located at the center of each of the two image blocks 1411 and 1412 with the scan line changing point P1 being sandwiched in between are smaller in FIG. 14B than those in FIG. 14A. The reason is that in the correction coefficient set for the high-quality mode in FIG. 6B, the values of the correction coefficients at the center in the range that the variable x can take are set to smaller values compared to those of the correction coefficient set for the normal mode in FIG. 6A. For example, in a case where the variable x is in the range between 7 and 11, in the correction coefficient set in FIG. 6A for the normal mode, K0 is "7, 7, 6, 5, 5" and K1 is "5, 5, 6, 7, 7". On the other hand, in the correction coefficient set in FIG. 6B for the high-quality mode, K0 is "6, 5, 5, 5, 4" and K1 is "4, 5, 5, 5, 6". By setting the correction coefficients as described above, the pixel values after the correction corresponding to the portion in the vicinity of the center between the adjacent scan line changing points are smaller in the high-quality mode compared to those in the normal mode. Due to this, a bulge as shown in FIG. 5F described previously is suppressed from occurring in the vicinity of the center between the scan line changing points in the dot line that is formed.

In the example described above, explanation is given by taking the case as an example where the RGB values of the input image are converted into the CMYK values corresponding to the four kinds of toner and then full color printing is performed, but the example is not limited to this. For example, it is also possible to apply the present embodiment to monochrome printing and monocolor printing in which the RGB values of an input image are converted into a tone level value corresponding to one kind of toner (for example, only K or C) and then the image is output. Further, the color space of an input image is not limited to RGB.

Furthermore, in the example described above, it is assumed that the printing mode has the two modes, that is, the high-quality mode and the normal mode, but this is not limited and it may also be possible to select a printing mode from among three or more printing modes. In a case where printing is performed at a toner density higher than that in the reference printing mode, on a condition that correction processing is performed by applying a correction coefficient set whose correction coefficients are adjusted in accordance with the toner density, it is possible to widely apply the present embodiment.

Modification Example

The correction coefficient set (FIG. 6A and FIG. 6B) used in the example described above includes the two rows of K0 and K1 and in the group (pair) of K0 and K1, the correction coefficient to be applied to the pixel of interest and the correction coefficient to be applied to at least one of adjacent pixels with respect to the pixel of interest in the sub scanning direction are specified. However, the configuration of the correction coefficient set is not limited to this and for example, the correction coefficient set may include three rows of K0, K1, and K2. That is, it may also be possible to use a correction coefficient set that associates the variable x with one group (combination) of a correction coefficient to be applied to the pixel of interest and correction coefficients to be applied to both adjacent pixels with respect to the pixel of interest in the sub scanning direction.

FIG. 15A is an example of a correction coefficient set including three rows for the normal mode according to the present modification example. In a case where the correction coefficient set in FIG. 15A is used as it is in the high-quality mode, in a dot line that is formed, a bulge occurs in the vicinity of the scan line changing point, and therefore, the thickness is uneven. The reason is that the correction coefficients of K0 and K2 in a case where the variable x is 1 to 4, and the correction coefficients of K0 and K1 in a case where the variable x is 13 to 15 are approximately equal, and therefore, a dot in a case where two sub-pixels less than one pixel, which have been corrected in accordance with those correction coefficients, are arranged one on top of another in the sub scanning direction becomes large in the sub scanning direction. Consequently, in the high-quality mode, a correction coefficient set including three rows, in which the correction coefficients at both end portions in the range that the variable x can take are made small as shown in FIG. 15 is used. Due to this, it is made possible to make small the pixel values after the correction in the vicinity of the scan line changing point in the high-quality mode compared to those in the normal mode.

The tone level value V_corr after the correction processing in this case is represented by equation (4) and equation (5) below, respectively, in accordance with the shift direction in the scan line changing processing. The value is rounded off to the nearest integer.

Downward Shift in the Sub Scanning Direction $$V\_corr=\{K0(x)\times(\text{tone level value of pixel of interest})+K1(x)\times(\text{tone level value of upper adjacent pixel with respect to pixel of interest})+K2(x)\times(\text{tone level value of lower adjacent pixels with respect to pixel of interest})\}\div 15 \quad \text{equation (4)}$$

Upward Shift in the Sub Scanning Direction $$V\_corr=\{K0(x)\times(\text{tone level value of pixel of interest})+K2(x)\times(\text{tone level value of upper adjacent pixel with respect to pixel of interest})+K1(x)\times(\text{tone level value of lower adjacent pixel with respect to pixel of interest})\}\div 15 \quad \text{equation (5)}$$

Due to this, as in the case with the correction coefficient set including the two rows described previously, it is possible to form a line whose thickness is even also in the high-quality mode.

As above, according to the present embodiment, the correction coefficient set used in the correction processing performed after the scan line changing processing is switched to another in accordance with the printing mode. Due to this, also in a case also where printing is performed at a high density by increasing the amount of toner to be supplied per unit area, it is made possible to make even the thickness of a line in the main scanning direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, also in a case where an image is formed in the high-quality mode in which the maximum amount of toner is increased compared to that in the normal mode, it is possible to effectively suppress a registration shift and a color shift by image correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095865, filed May 18, 2018 which is hereby incorporated by reference wherein in its entirety.

What is claimed is:

1. An image forming apparatus having a first printing mode and a second printing mode whose development parameters are different from those of the first printing mode, and performing electrophotographic printing, the image forming apparatus comprising:
    at least one controller, having at least one processor which executes instructions stored in at least one memory, at least one circuitry or a combination of the at least one processor and the at least one circuitries, being configured to:
    perform scan line changing processing to shift an image in units of pixels in a sub scanning direction at a predetermined scan line changing point in a main scanning direction in accordance with characteristics of a laser scan line; and
    correct a tone level value of a pixel of interest in an image after the scan line changing processing by referring to a tone level value of an adjacent pixel neighboring the pixel of interest in a sub scanning direction, wherein
    the at least one processor executes instructions in the memory device to:
    perform the correction by using a correction coefficient set in which a group of a correction coefficient to be applied to the pixel of interest and a correction coefficient to be applied to at least one of the adjacent pixels with respect to the pixel of interest in a sub scanning direction is associated with a variable specifying a relative position in a main scanning direction with the scan line changing point being taken as a start point; and
    use the different correction coefficient set between a case where printing is performed in the first printing mode and a case where printing is performed in the second printing mode.

2. The image forming apparatus according to claim 1, wherein
    in at least one or more groups in the correction coefficient set used in the second printing mode, a total value of a correction coefficient to be applied to the pixel of interest and a correction coefficient to be applied to at least one of the adjacent pixels with respect to the pixel of interest in a sub scanning direction is smaller than a total value of a correction coefficient to be applied to the pixel of interest specified by a corresponding group in the correction coefficient set used in the first printing mode and a correction coefficient to be applied to an adjacent pixel.

3. The image forming apparatus according to claim 2, wherein
the correction coefficient set specifies, in the group, a correction coefficient to be applied to the pixel of interest and a correction coefficient to be applied to one of adjacent pixels with respect to the pixel of interest in a sub scanning direction.

4. The image forming apparatus according to claim 3, wherein
a value of the variable associated with a group whose total value is small in the correction coefficient set used in the second printing mode is at the center value of a range that the variable can take.

5. The image forming apparatus according to claim 2, wherein
the correction coefficient set specifies, in the group, a correction coefficient to be applied to the pixel of interest and correction coefficients to be applied to both adjacent pixels with respect to the pixel of interest in a sub scanning direction.

6. The image forming apparatus according to claim 5, wherein
a value of the variable associated with a group whose total value is small in the correction coefficient set used in the second printing mode is at both ends of a range that the variable can take.

7. The image forming apparatus according to claim 1, wherein
the second printing mode is an operation mode in which printing is performed by extending a color gamut compared to that in the first printing mode.

8. The image forming apparatus according to claim 1, wherein
the second printing mode is an operation mode in which printing is performed with saturation higher than that in the first printing mode.

9. The image forming apparatus according to claim 1, wherein
in the second printing mode, printing is performed by increasing a laser light quantity per unit area as the development parameter compared to that in the first printing mode.

10. The image forming apparatus according to claim 1, wherein
in the second printing mode, printing is performed by increasing a ratio of rotation speed of a development motor to that of a photoconductor drum as the development parameter compared to that in the first printing mode.

11. A method of generating image data for an image forming apparatus having a first printing mode and a second printing mode whose development parameters are different from those of the first printing mode and performing electrophotographic printing, the method comprising the steps of:
performing scan line changing processing to shift an image in units of pixels in a sub scanning direction at a predetermined scan line changing point in a main scanning direction in accordance with characteristics of a laser scan line; and
correcting a tone level value of a pixel of interest in an image after the scan line changing processing by referring to a tone level value of an adjacent pixel neighboring the pixel of interest in a sub scanning direction, wherein
at the correction step:
the correction is performed by using a correction coefficient set in which a group of a correction coefficient to be applied to the pixel of interest and a correction coefficient to be applied to at least one of the adjacent pixels with respect to the pixel of interest in a sub scanning direction is associated with a variable specifying a relative position in a main scanning direction with the scan line changing point being taken as a start point; and
different correction coefficient set is used between a case where printing is performed in the first printing mode and a case where printing is performed in the second printing mode in the image forming apparatus.

12. A non-transitory computer readable storage medium storing a program for causing a computer to perform a method of generating image data for an image forming apparatus having a first printing mode and a second printing mode whose development parameters are different from those of the first printing mode and performing electrophotographic printing, the method comprising the steps of:
performing scan line changing processing to shift an image in units of pixels in a sub scanning direction at a predetermined scan line changing point in a main scanning direction in accordance with characteristics of a laser scan line; and
correcting a tone level value of a pixel of interest in an image after the scan line changing processing by referring to a tone level value of an adjacent pixel neighboring the pixel of interest in a sub scanning direction, wherein
at the correction step:
the correction is performed by using a correction coefficient set in which a group of a correction coefficient to be applied to the pixel of interest and a correction coefficient to be applied to at least one of adjacent pixels with respect to the pixel of interest in a sub scanning direction is associated with a variable specifying a relative position in a main scanning direction with the scan line changing point being taken as a start point; and
different correction coefficient set is used between a case where printing is performed in the first printing mode and a case where printing is performed in the second printing mode in the image forming apparatus.

* * * * *